United States Patent [19]

Gridley

[11] 4,339,254

[45] Jul. 13, 1982

[54] GLASS MANUFACTURE EMPLOYING A SILICON CARBIDE REFINING AGENT

[75] Inventor: Marvin C. Gridley, Muncie, Ind.

[73] Assignee: Ball Corporation, Muncie, Ind.

[21] Appl. No.: 301,559

[22] Filed: Sep. 14, 1981

Related U.S. Application Data

[63] Continuation-in-part of Ser. No. 193,045, Jun. 6, 1980, abandoned.

[51] Int. Cl.³ .............................. C03C 3/04; C03B 1/00
[52] U.S. Cl. .......................................... 65/27; 65/134; 65/136; 501/29; 501/31; 501/70; 501/88
[58] Field of Search .................. 65/27, 134, 135, 136; 106/DIG. 8; 501/29, 31, 70, 88

[56] References Cited

U.S. PATENT DOCUMENTS 2,611,712  9/1952  Ford ....................................... 501/39
3,788,832  1/1974  Nesbitt et al. ..................... 65/135 X

FOREIGN PATENT DOCUMENTS 2046973  3/1972  Fed. Rep. of Germany ........ 65/134
50-16709  2/1975  Japan ..................................... 65/134
503825  3/1976  U.S.S.R. .

Primary Examiner—Richard V. Fisher
Attorney, Agent, or Firm—Gilbert E. Alberding

[57] ABSTRACT

A method of rendering substantially seed-free glass is disclosed by incorporating into glass batch materials a carbide compound, such as silicon carbide. The compound may be present in concentrations as low as about 0.001 weight percent and as high as 0.025 weight percent of the total batch.

14 Claims, 2 Drawing Figures

GLASS MANUFACTURE EMPLOYING A SILICON CARBIDE REFINING AGENT

BACKGROUND OF THE INVENTION

1. Field of the Invention

This patent application is a continuation-in-part of my patent application Ser. No. 193,045, filed June 6, 1980, now abandoned.

This invention relates to the manufacture of glass. More particularly, this invention relates to the melting operation.

2. Description of the Prior Art

In the production of glass articles the principal ingredients for the glass batch materials are brought together and thoroughly mixed and charged into a furnace where the materials melt or fuse into a viscous liquid. During the melting operation numerous chemical reactions take place that result in the liberation of gaseous components. The formation of these gaseous components in the viscous liquid have some advantage in that they proceed upwardly to escape from the viscous liquid and in the process serve to stir and homogenize the mass. Although most of the gases escape from the liquid, some remain and become imbedded forming gaseous inclusions, generally referred to as seeds. These seeds are very minute gas occlusions which are unsightly and unappealing to an ultimate purchaser and are further undesirable in that such occlusions present areas of structural weakness in a final glass article. When there are excessive gatherings of seeds in the glass this is indicative of a glass which is not as strong as a glass free of any seeds. Moreover, the presence of seeds is indicative that the melting process itself was not carried out satisfactorily. Seeds generally fall into a range of about 0.001 inch to about 0.030 inch diameter and are usually measured as the number of seeds per given section or volume.

The process used in the glass-forming operation which results in removing these gaseous bodies in glass is designated as fining. Both mechanical and chemical approaches have been used. A number of chemical fining agents have been used, the agents either function by releasing gases themselves or volatilizing the gaseous bodies at high temperatures in glass batch compositions.

Illustrative of the prior art patents employing chemical approaches are U.S. Pat. No. 1,536,919 to Parkinson wherein coal, charcoal or other carbonaceous material are used as a reducing batch ingredient to achieve a clear, seedless glass and U.S. Pat. No. 1,545,508 to Montgomery where antimony oxide is employed in excess of one percent to aid in clearing glass from bubbles or seeds. Other patents illustrative of the prior art include U.S. Pat. No. 1,995,952 to Taylor, which describes materials such as sulfur, selenium and tellurium being utilized for fining agents in glass batch compositions. Further, in U.S. Pat. No. 2,009,763 to Dalton, compounds containing iodine or compounds thereof such as iodine, iodide, iodate, and iodoform are described as good fining agents for glass batch materials. The use of helium has been suggested in U.S. Pat. No. 2,038,627 to Badger, the gas being used to displace interstitial air in batch materials so that any bubbles in the molten glass are removed and the incorporated helium is merely allowed to diffuse out of the molten glass. Other chemical fining agents have been suggested such as sodium chloride in U.S. Pat. No. 2,773,775 to Levengood. A recommended fining agent is blast furnace slag suggested by Monks in U.S. Pat. No. 3,150,991 wherein the patentee discloses the use of slag in an amount between about 0.01 and 2 percent to reduce the seed content in the final glass. A further method is disclosed in U.S. Pat. No. 3,589,885 by the same patentee of reducing the seed content of glass by using a sulfate impregnated carbonaceous material. Of recent interest is U.S. Pat. No. 3,615,767 to Conroy, Jr., et al, wherein sodium sulfite is used in minor amounts ranging from about 0.015 to about 1.8 percent weight percent with glass batch materials that are charged to the furnace. Lastly, U.S. Pat. No. 3,837,831 to Moore suggests the use of copper oxide as a batch ingredient for soda-lime amber glass to decrease the incidence of gaseous inclusions.

Fining agents may be used in dry and wet glass batch as well as with loose and compact glass batch materials. In the conventional manufacture of glass, loose glass-forming materials including the fining agent are introduced into a glass-producing furnace generally in a dry or, if desired, moistened condition. In such operations, materials are mixed prior to introduction into the furnace by any of a number of mixing means well-known to the art. Although the glass-forming materials are well mixed, it is generally found that subsequent processing and handling of the mixed, loose batch materials often causes segregation. Thus, because of the different densities and particle size of the materials, there is a marked tendency of the various ingredients to settle or separate one from the other. This segregation of the loose glass batch material is objectionable in that nonuniform charges of ingredients are often introduced into the furnace. Moreover, in such methods of conveying loose batch materials, there is formation of dust that, to say the least, causes a nuisance in the immediate working area. Further, when introduced into the furnace, the dust associated with the loose batch materials influences melting of the refractory surfaces and clogging of the checkers, as well as flues of the furnace system.

In the past, the problem of dust carry-over and segregation of constituents has been particularly troublesome where very fine particle sizes make up a substantial portion of the batch materials. In order to remedy this problem various liquid ingredients have been incorporated with the glass batch material in order to substantially reduce the amount of dust formation and segregation of constituents. In this regard small additions of water have been commonly used and found to be most effective in that the mobility of the particles are reduced as compared to dry batch materials. Glass batch materials, whether in the wet form or dry form, still suffer from a loss of fining agent when exposed to any heating, especially prolonged heatings, prior to introduction into the glass-forming furnace. Of course, the loss of the fining agent is disadvantageous in that its loss renders a glass that is unrefined and has a large number of seeds or gaseous inclusions. Again, the loss of the fining agent is particularly noticeable when both materials are subjected to preheating temperatures over a considerable period of time. Thus, if batch materials are subjected to a preheating step prior to introduction into the glass-forming furnace, there is a marked tendency for the fining agent to undergo chemical change, for example oxidation, and its benefits lost during the melting stage within the glass-forming furnace.

The loss of the fining agent is noticeable in glass batch materials having a compact form. It has been proposed to form discrete units by means of compacting or agglomerating glass batch materials and allowing said materials to be subjected to heated currents or hot gases, especially those of high temperature supplied entirely or in part from the glass furnace exhaust gases. In this way a substantial amount of the energy that is generally not recoverable from a glass furnace can be used to heat the compact units and to also prereact the glass batch materials before they enter the glass-forming furnace. This loss or alteration of fining agents during the heating process, whether in dry or wet, loose or compact form, which is especially noticeable during the preheating stage with compact glass batch materials, has received little attention in the field of preheating glass batch materials.

It is an object of the present invention to provide a more effective fining agent during the melting of glass batch materials which will substantially reduce the seed level or entrapped gaseous inclusions in a final glass article.

It is a further object of the present invention to provide a method of refining glass which will permit the use of lower temperatures than those conventionally required to obtain dissolution of glass batch materials.

It is an object of this invention to provide noncellular glass bodies, substantially free of gaseous inclusions.

It is still yet another objective of the subject invention to provide a fining agent which is not altered or substantially changed during a preheating or prereaction cycle prior to introduction into the glass-forming furnace.

These and other objects will be apparent from the following description.

SUMMARY OF THE INVENTION

Figure 1:
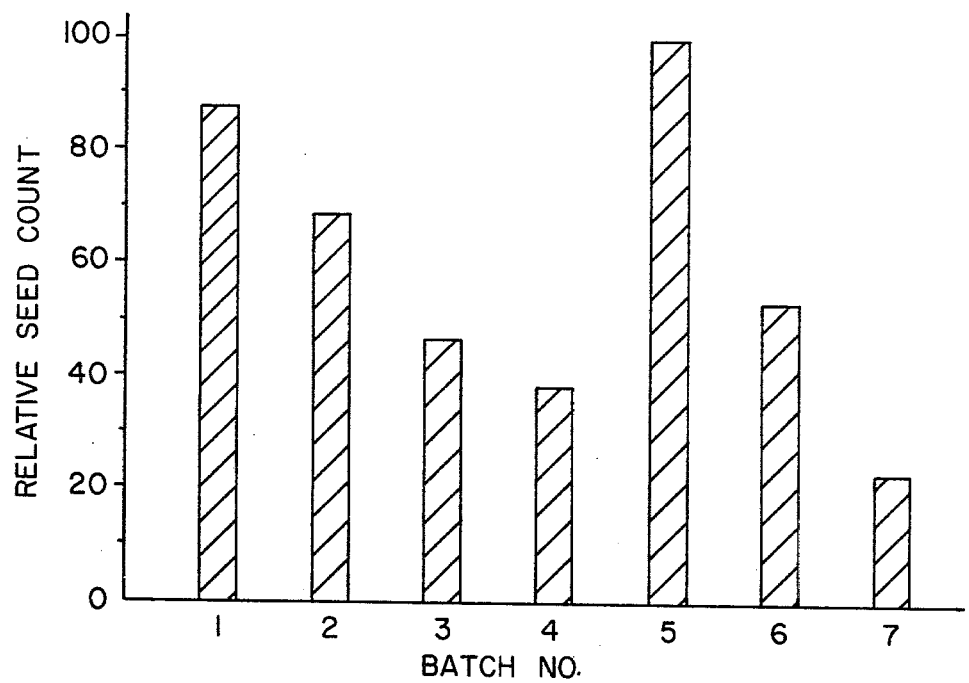
FIG. 1 is a graph showing the effect of minor additions of silicon carbide on the seed reduction of soda-lime glass.

It has now been found that glass batch materials can be melted in a glass furnace so that the number and size of gaseous inclusions in the final glass may be substantially reduced by adding to such materials a minor but effective amount of silicon carbide. In carrying out the subject invention conventional glass batch materials, e.g., sodium carbonate, calcium oxide, and silica and other minor components in proportions well known in the art, are mixed with the required amounts of silicon carbide until a homogeneous mixture has been obtained. The carbide compound can be present in the batch in amounts as little as 0.001 percent by weight to upwards of about 0.025 percent, although best results are obtained at a concentration of about 0.003 weight percent. It was surprising to determine that a small concentration of this carbide is a very effective fining compound.

In particular, the subject invention relates to a method of substantially reducing gaseous inclusions in a glass article comprising combining glass batch ingredients, adding to the ingredients about 0.001 to about 0.025 weight percent of silicon carbide, and heating the ingredients to a molten state to effect the complete melting of the batch material, and thereafter withdrawing molten glass to form a glass article.

In the subject invention the presence of the carbide compound results in the fining of the glass batch material by apparently expelling the undesirable gas bubbles formed during the melting operation. In this regard the carbide compound has been found to be effective along with batch materials or with other materials including sulfates.

Generally, there is no particular order of mixing the glass-forming materials including sand, soda ash, and limestone with the fining agent. Further, the mixing of the materials herein described may be accomplished by any conventional means known to the art. Thus, one may employ various mixing devices including pug mills, rotary mills, tumblers, mix mullers and other like devices. It is only important that the various ingredients be thoroughly mixed, water may be generally incorporated to reduce segregation and dust formation as previously described.

Although the subject invention relates to the incorporation of silicon carbide into the glass-forming materials, it will be appreciated that the carbide compound may be added to dry batch as well as wet batch. However, a preferred embodiment of the subject invention is where wet batch has been utilized and, in particular, where the wet batch has been subjected to agglomeration or compaction techniques. In these forms the glass batch materials may be subjected to preheating conditions prior to introduction into the glass-forming furnace such as subjecting discrete, compact units (pellets, briquettes, etc.) to glass furnace exhaust gases (about 900° to 1800° F.) and in this respect the conventional fining agents were generally found to be ineffective in that they were chemically altered or substantially lost during the preheating step so that any glass material produced therefrom had substantial amount of gaseous inclusions therein.

Although the carbide compound may be added in any form, a preferred form is in powder or particle form. The silicon carbide employed may be the ordinary black, gray or green forms of silicon carbide crystallized in the hexagonal system. There is a wide range of particle sizes that can be used, but beneficial results are obtained where the particles are in the range of about 20 mesh to about 325 mesh, and more preferably between about 30 mesh to about 120 mesh.

The use of carborundum or silicon carbide in glass batch materials has been disclosed in U.S. Pat. No. 2,611,712 to Ford wherein the carborundum in conjunction with an oxidizing agent acts to generate gas for forming a low density, highly cellular or frothlike body of partially melted glass suitable for use as a heat insulation medium. In the subject invention the use of silicon carbide is used to withstand the relatively high temperatures encountered in the preheating operation, generally below about 2000° F., and usually between about 900° F., to 1800° F., and still effect fining in the glass making process. It was earlier found that a conventional fining system for glass batch materials cannot withstand the conditions of preheating and still maintain their function as fining agents.

Any of the commercial grades of the carbide compounds are suitable for the process herein disclosed. Silicon carbide is a preferred carbide compound and is a commercially available material. The method of its manufacture is well known. A typical method of its manufacture is described in U.S. Pat. No. 2,860,999.

In carrying out the present invention, the carbide compound can be used alone or in combination with sodium sulphate. However, the carbide compound is more effective than the sodium sulphate alone as a fining agent but the combination of sulphate and carbide is considered a preferred embodiment as a fining agent.

The following examples are given to illustrate the present invention and are not deemed to be limiting thereof.

EXAMPLE 1

A conventional soda-lime glass batch composition was prepared having the following ingredients:

|  | Wt. % |
|---|---|
| Sand | 55.1 |
| Feldspar | 9.4 |
| Limestone | 16.0 |
| Soda Ash | 19.5 |

Additions to the batches 1 through 4 of salt cake, carbon or silicon carbide were made as set forth in Table I. Batches were thoroughly mixed in a laboratory mixer followed by the addition of about 5 percent water to restrict segregation. For batches 1 through 4, 150 grams of thoroughly mixed, wet loose batch was transferred to a platinum crucible and melted at 2600° F., for two hours whereby the materials were completely melted. Glass was poured into two-inch diameter molds, annealed, and the resultant samples were carefully examined for seed content. It was found that the glass melted from batches 3 and 4 was significantly more seed-free than batch 1 and slightly more seed-free than batch 2. Reference is made to FIG. 1 which depicts the relative seed count for these batches. The expression relative seed count refers to the number of seeds per unit volume of glass, with a sample in a group having the greatest number of seeds being taken as 100, and all other samples in that group compared to that sample and expressed as a percentage of that maximum seed count. FIG. 1 shows the increased effectiveness of silicon carbide alone or with a small amount of salt cake over salt cake alone or salt cake with a small amount of carbon under normal melting conditions.

EXAMPLE 2

Another series of batches 5 through 7 (see Table I) received a heat treatment prior to melting. Batches of the same base composition as Example 1 were thoroughly mixed with the indicated, additions, followed by mixing with about 5 percent water to prevent segregation. One hundred fifty grams of batch were placed in platinum crucibles and preheated at 1450° F., for 45 minutes, then melted at 2600° F., for two hours to completely melt the batch materials. After pouring into molds and annealing, samples were compared for seed content as under Example 1. Glass from batches 6 and 7, which contained the equivalent of 0.2 and 0.1 lb. of silicon carbide per ton of sand, respectively, was significantly more seed-free than the glass from batch 5, which contained salt cake and carbon. Reference is made to FIG. 1 depicting the relative seed count for batches 5 through 7. This example illustrates the greater effectiveness of silicon carbide as a fining agent, alone or in conjunction with a small amount of salt cake, after exposure to a prolonged preheating period at a high temperature.

TABLE I

| Batches | Lb./Ton of Sand | | | Preheat Temp. (°F.) |
|---|---|---|---|---|
|  | Salt Cake | Carbon | Silicon Carbide |  |
| 1 | 20 | — | — | — |
| 2 | 20 | 1 | — | — |
| 3 | 5 | — | 0.2 | — |
| 4 | — | — | 0.1 | — |
| 5 | 20 | 1 | — | 1450° F., 45 min. |
| 6 | 5 | — | 0.2 | " |
| 7 | — | — | 0.1 | " |

EXAMPLE 3

Figure 2:
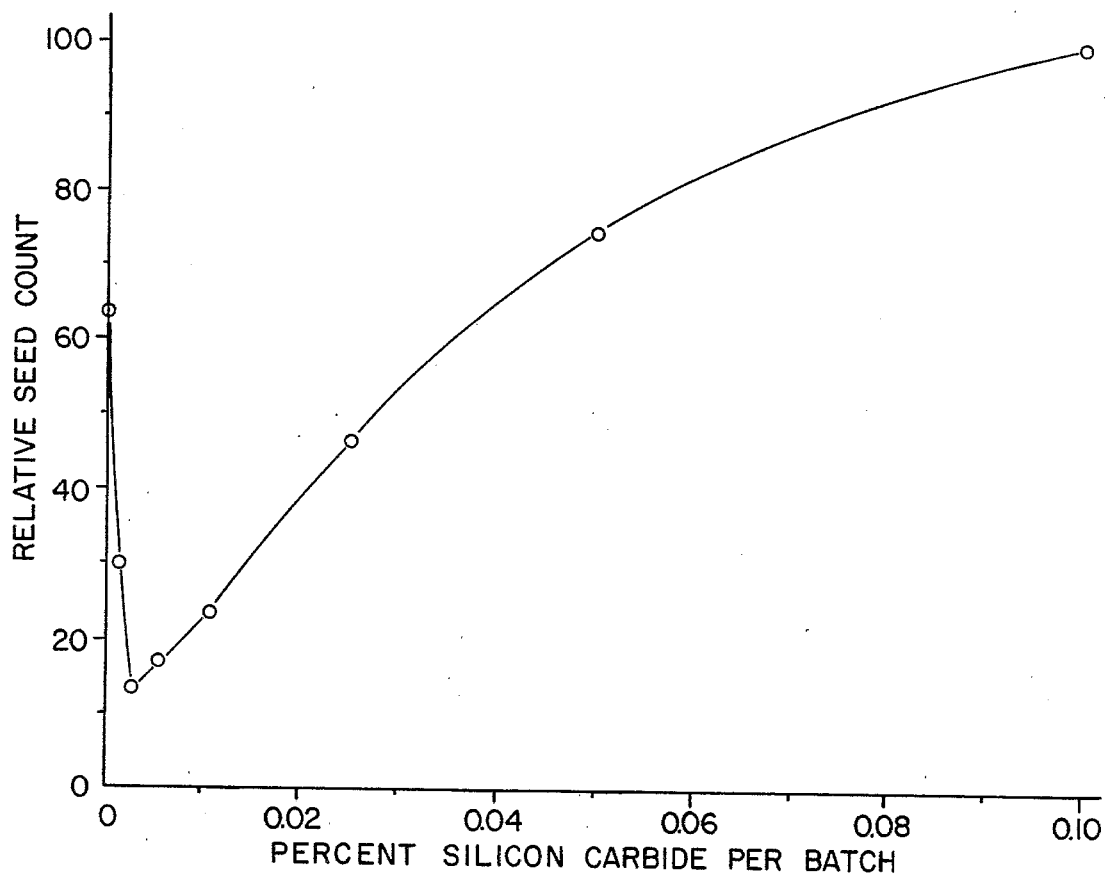
FIG. 2 shows the relative seed count for addition of silicon carbide in soda-lime glass in accordance with this invention.

A third series of batches, 9 through 14, was prepared to illustrate the effect of the amount of silicon carbide on seed count. Batches of the same base composition as Example 1 were thoroughly mixed with the indicated quantity of silicon carbide (see Table II), which varied over a range of 0 to about 0.025 percent by weight of the batch. About 5 percent water was added to retard segregation. Seventy grams of batch were transferred to platinum crucibles and placed in a furnace at 2600° F., for one hour to completely melt the batch materials. Glass was poured into patties, annealed and compared for seed content. The relative seed counts obtained are listed in Table II and shown graphically in FIG. 2. These tests clearly demonstrate that small additions of silicon carbide, especially in the range of about 0.001 percent to about 0.025 percent, are effective fining agents for conventional glass batch materials. For example, a level of silicon carbide of only 0.0014 percent (Batch No. 10) produced a relative seed count of about 47 percent of that obtained with no silicon carbide added. The greatest reduction in seed count was found for Batch No. 11, which contained silicon carbide at a level of 0.0028 percent and gave a glass having a relative seed count of only 20 percent. Even at a level of silicon carbide addition of 0.025 percent (Batch No. 14), the resultant relative seed count was only 74 percent of that for the batch containing no silicon carbide.

TABLE II

| Batch No. | Wt. % Silicon Carbide per Batch | Relative Seed Count (percent) |
|---|---|---|
| 9 | 0 | 100 |
| 10 | 0.0014 | 47 |
| 11 | 0.0028 | 20 |
| 12 | 0.0055 | 25 |
| 13 | 0.011 | 36 |
| 14 | 0.025 | 74 |

Pursuant to the requirements of the patent statutes, the principle of this invention has been explained and exemplified in a manner so that it can be readily practiced by those skilled in the art, such exemplification including what is considered to represent the best embodiment of the invention.

What is claimed is:

1. A method of substantially reducing gaseous inclusions in a glass article, comprising combining glass batch ingredients, adding to the ingredients about 0.001 to about 0.025 weight percent of silicon carbide, and heating the ingredients to a molten state to effect the complete melting of the batch material, and thereafter withdrawing molten glass to form a glass article.

2. A method of claim 1 wherein the batch ingredients comprise sodium carbonate, lime and silica.

3. A method of claim 1 wherein the silicon carbide is present at about 0.003 weight percent of the total batch.

4. A method of substantially reducing gaseous inclusions in glass, comprising combining glass batch ingredients, adding to the ingredients about 0.001 to about 0.025 weight percent of silicon carbide, subjecting the combined batch ingredients to preheating, thereafter melting the preheated batch to effect the complete melting of the batch ingredients, and withdrawing molten glass to form a glass article.

5. A method of claim 4 wherein the main ingredients of the batch comprise sodium carbonate, lime and silica.

6. A method of claim 4 wherein the silicon carbide is present at about 0.003 weight percent of the total batch.

7. A method of claim 4 wherein the combined batch ingredients are in the form of compact units.

8. In a process of melting glass batch materials containing glass-forming ingredients to form a glass article wherein the batch materials are compacted units that are subjected to a heated atmosphere and thereafter completely melted, the improvement which comprises adding to said batch materials about 0.001 to about 0.025 weight percent of silicon carbide whereby improved refining and melting is obtained.

9. Process of claim 8 where the main ingredients of said glass batch comprise sodium carbonate, lime and silica.

10. Process of claim 8 wherein the temperature of the heated atmosphere is between about 900° F., and about 1800° F.

11. A method of reducing gaseous inclusions during a glass melting process, comprising providing glass batch materials, adding to said materials in a weight percent between about 0.001 and about 0.025 of silicon carbide, compacting said materials, allowing hot gases to contact the compact materials and passing said heated compact materials into a melting furnace to effect the complete melting of the batch materials.

12. A method of claim 11 wherein the hot gases are exhaust furnace gases of a glass melting furnace.

13. A method of claim 12 wherein the hot gases are at a temperature between about 900° F., and 1800° F.

14. A method as recited in claim 11 wherein the glass batch materials are melted at about 2600° F.

* * * * *